US011519313B1

(12) United States Patent
Martz et al.

(10) Patent No.: US 11,519,313 B1
(45) Date of Patent: Dec. 6, 2022

(54) METHODS AND SYSTEMS FOR ENGINE EXHAUST CATALYST OPERATIONS

(71) Applicant: Ford Global Technologies, LLC, Dearborn, MI (US)

(72) Inventors: Jason Brian Martz, Canton, MI (US); Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/444,471

(22) Filed: Aug. 4, 2021

(51) Int. Cl.
*F01N 3/00* (2006.01)
*F01N 3/20* (2006.01)

(52) U.S. Cl.
CPC ........ *F01N 3/2013* (2013.01); *F01N 2240/16* (2013.01); *F01N 2430/10* (2013.01); *F01N 2900/104* (2013.01); *F01N 2900/12* (2013.01); *F01N 2900/1602* (2013.01)

(58) Field of Classification Search
CPC .............. F01N 3/2013; F01N 2240/16; F01N 2430/10; F01N 2900/104; F01N 2900/12; F01N 2900/1602
See application file for complete search history.

(56) References Cited

U.S. PATENT DOCUMENTS

| | | | |
|---|---|---|---|
| 5,968,456 A | 10/1999 | Parise | |
| 6,637,204 B2* | 10/2003 | Ellmer | F02D 23/00 60/303 |
| 6,938,420 B2* | 9/2005 | Kawamura | F02D 41/0007 60/609 |
| 6,951,099 B2 | 10/2005 | Dickau | |
| 8,413,423 B2* | 4/2013 | Roos | F01N 9/00 180/65.265 |
| 9,366,215 B2* | 6/2016 | Cunningham | F02N 11/0818 |
| 9,410,458 B2* | 8/2016 | Gonze | F01N 3/2026 |
| 10,167,795 B2* | 1/2019 | Disaro' | F01N 3/2026 |
| 10,301,991 B1* | 5/2019 | Dudar | F02M 35/1038 |
| 10,975,789 B2 | 4/2021 | Martz et al. | |
| 2018/0340480 A1* | 11/2018 | Mehta | F01N 3/2013 |
| 2019/0285017 A1* | 9/2019 | Dudar | F02D 41/064 |
| 2020/0116061 A1 | 4/2020 | Hupfeld et al. | |
| 2021/0087990 A1 | 3/2021 | Paukner et al. | |

FOREIGN PATENT DOCUMENTS

| | | | | |
|---|---|---|---|---|
| DE | 102010027220 A1 | | 1/2012 | |
| DE | 102019115141 A1 | * | 12/2020 | |
| JP | 2003307134 A | * | 10/2003 | ........... F01N 3/2006 |

* cited by examiner

*Primary Examiner* — Matthew T Largi
(74) *Attorney, Agent, or Firm* — Vincent Mastrogiacomo; McCoy Russell LLP

(57) ABSTRACT

Methods and systems are provided for expediting exhaust catalyst light-off prior to an anticipated engine cold-start event. In one example, a method may include, in anticipation of an engine cold-start, preemptively operating an electric booster and routing compressed air to the catalyst to increase a temperature of the exhaust catalyst while maintaining the engine inactive.

20 Claims, 4 Drawing Sheets

METHODS AND SYSTEMS FOR ENGINE EXHAUST CATALYST OPERATIONS

FIELD

The present description relates generally to methods and systems for expediting exhaust catalyst light-off prior to an anticipated engine cold-start event.

BACKGROUND/SUMMARY

Engine emission control systems may include one or more exhaust catalysts such as three-way catalysts, NOx storage catalysts, light-off catalysts, and SCR catalysts. At catalyst light-off temperature (e.g., operational temperature), the exhaust catalyst may oxidize and reduce exhaust constituents in an exhaust gas, thereby converting toxic gases and pollutants in the exhaust gas to less toxic pollutants or inert constituents which are then released into the atmosphere. As an example, when operated between 400° C. and 600° C., a three-way catalyst converts reactive nitrogen oxides (NOx), carbon monoxide (CO) and unburned hydrocarbons (HC) into inert constituents such as diatomic nitrogen ($N_2$), carbon dioxide (CO2), and water ($H_2O$). However, during a cold-start of an engine, when a temperature of the exhaust catalyst is below the light-off temperature (e.g., three-way catalyst temperature falls below 400° C.), the exhaust catalyst may not be able to effectively treat the reactive constituents of the exhaust gas, and as a result, cold-start emissions may increase and the toxic constituents in the exhaust gas may be directly released into the atmosphere.

One way to reduce cold-start emissions is to decrease the time taken by the exhaust catalyst to reach light-off temperatures. As such, to expedite the attainment of the catalyst light-off temperature, engine systems may include heater pumps and/or catalyst heaters to preheat the main exhaust catalysts. One example of such an engine system is provided by Parise in U.S. Pat. No. 5,968,456. Therein, during a vehicle cold-start, a thermoelectric generator is used as a heat pump to heat an exhaust catalyst substrate to reduce the time to exhaust catalyst light-off. In this way, the exhaust catalyst comes up to operating temperature more rapidly, thereby reducing the amount of pollutant emissions at vehicle start-up.

However, the inventors herein have recognized potential issues with such a system. As one example, by initiating heating the exhaust catalyst after engine start, it may take a significantly long time for the catalyst to heat up. Also, adding a thermoelectric generator for the sole purpose of heating the exhaust catalyst during the vehicle cold-start may increase manufacturing costs. In addition, such systems may increase packaging requirements and complexity of the engine system. In some cases, these additional heaters may increase exhaust backpressure. Increased exhaust backpressure may lead to increased pumping work, reduced intake manifold boost pressure, cause cylinder scavenging and combustion effects, and further result in turbocharger problems.

In one example, the issues described above may be addressed by a method comprising: operating an electric booster to increase a temperature of an exhaust catalyst while maintaining the engine inactive. In this way, catalyst light-off times may be reduced and emission compliance requirements may be met.

As one example, an engine coupled to a hybrid vehicle may include an electric booster such as an electric turbine or an electric compressor to provide boost pressure during engine operation. Certain engines may also include an intake air pump to supply intake air during engine operation. Further, the engine may include an exhaust gas recirculation (EGR) system to selectively flow exhaust gas to engine intake based on engine dilution requirements. During an engine-off condition, in anticipation of an engine cold-start, an exhaust catalyst heating routine may be initiated by using energy from an on-board vehicle battery or a power source connected to the vehicle. The catalyst heating routine may include initiating the e-booster to supply compressed air to the catalyst. A dedicated catalyst heater may be activated to heat the compressed air entering the catalyst. If the e-booster is located in the intake manifold, an EGR valve may be opened and/or engine cylinder valves (intake and exhaust valves) may be opened to route the compressed air to the catalyst via the EGR passage. The intake throttle may be closed and the EGR valve opening may be adjusted to increase pressure and energy of air being transmitted to the catalyst. The engine is maintained off during the catalyst heating routine, and the engine may be started upon completion of the catalyst heating routine when the catalyst attains light-off temperature.

In this way, by preemptively heating an exhaust catalyst prior to an engine start, the time taken by the exhaust catalyst to reach light-off temperatures (or catalyst light-off time) may be reduced and the catalyst may be operational at the actual engine start. By using a combination of existing engine components such as the e-booster and the EGR passage, air flow through the catalyst may be increased to expedite catalyst heating. The technical effect of maintaining the engine off during the catalyst heating is that cold-start emissions may be reduced to zero, thereby improving emissions quality of the vehicle. By inhibiting exhaust flow during the catalyst warm up, release of undesired exhaust gases such as CO in a closed environment such as a parking garage may be reduced. Overall, catalyst light-off times may be reduced and emission compliance requirements may be met without significant additional costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
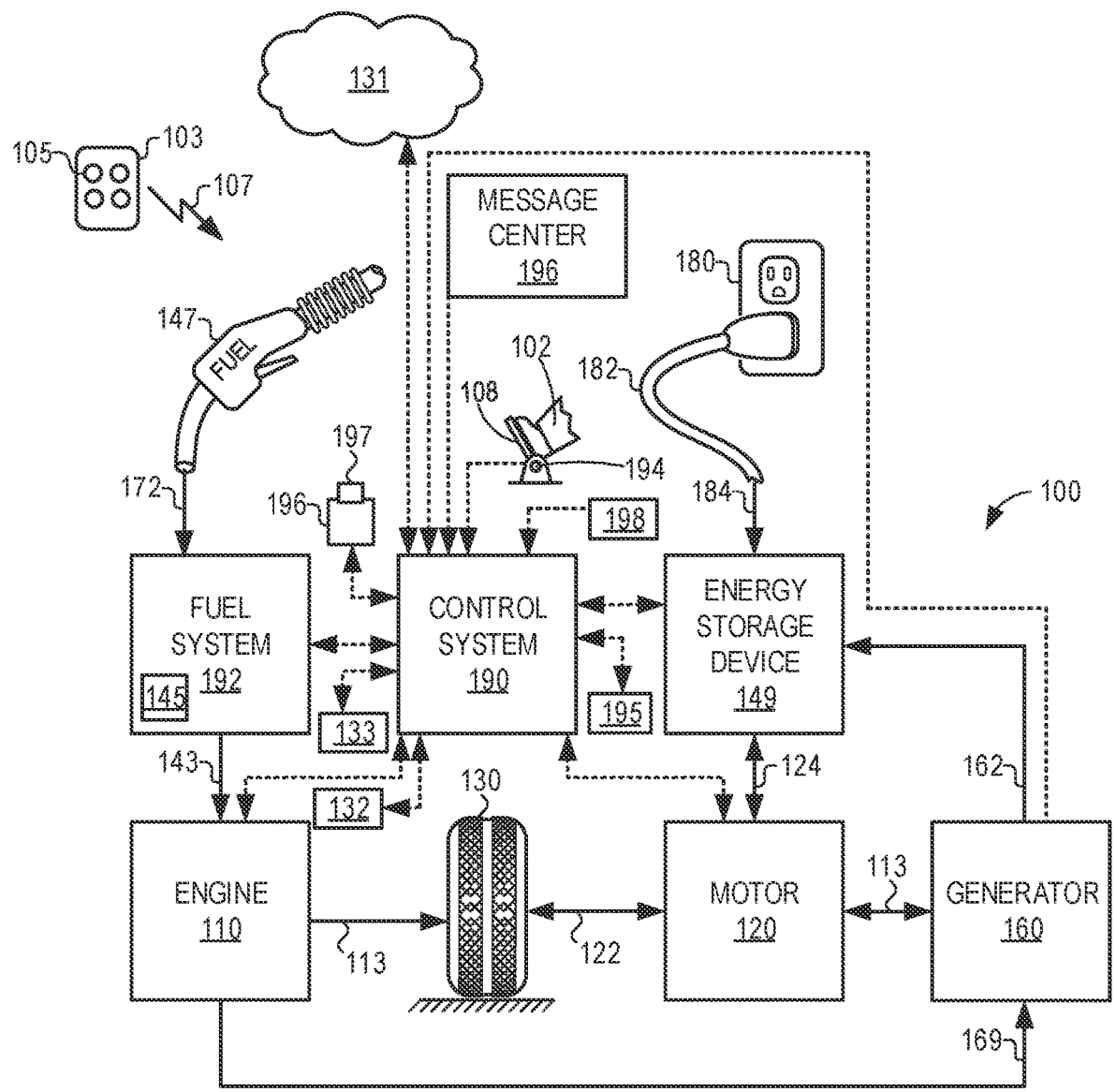
FIG. 1 schematically shows an example vehicle propulsion system
Figure 2:
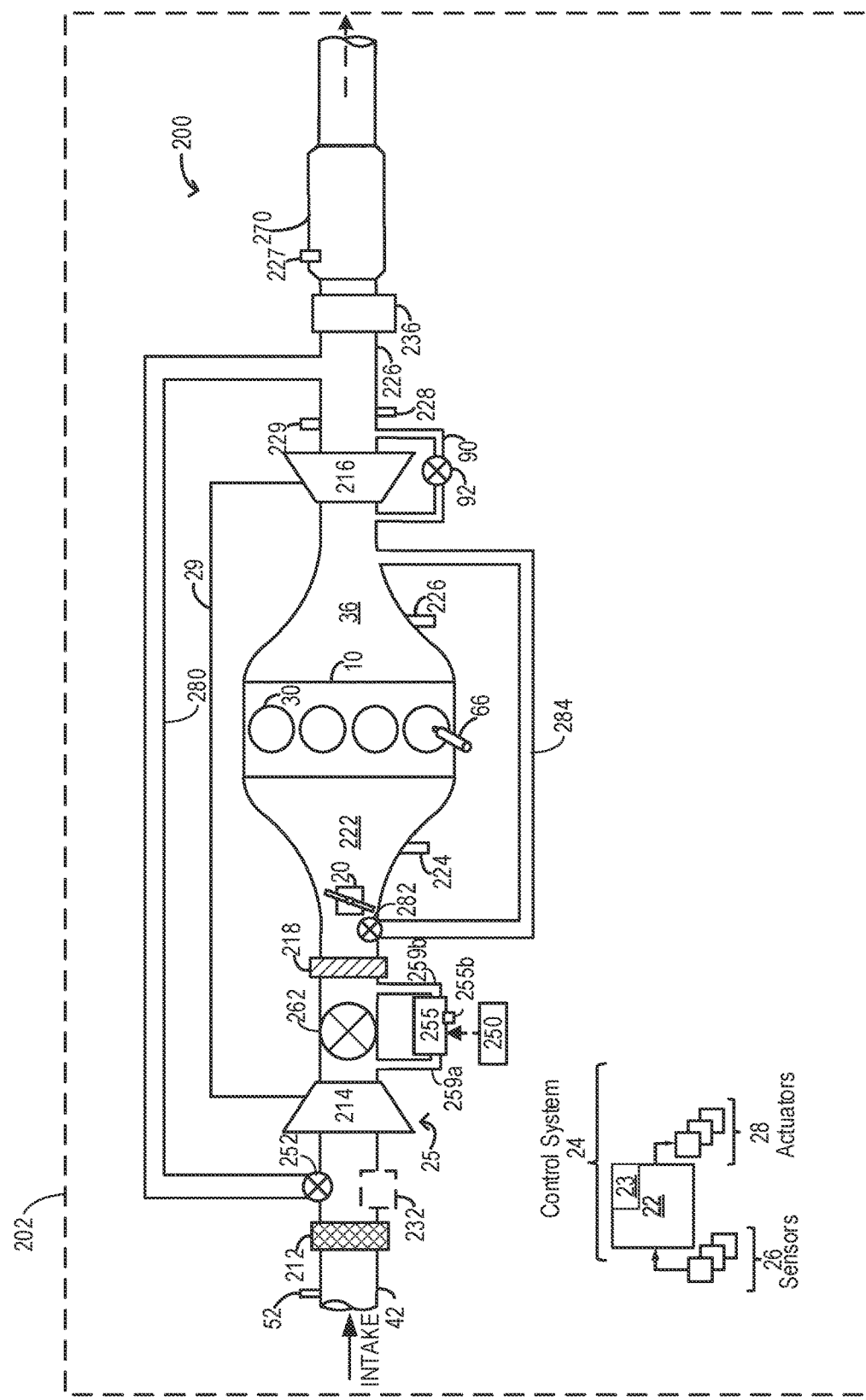
FIG. 2 shows a schematic diagram of an engine system including an electric booster and an exhaust catalyst

The following description relates to systems and methods for expediting exhaust catalyst light-off prior to an anticipated engine cold-start event. A hybrid vehicle system including a motor and an engine for vehicle propulsion is shown in FIG. 1. The engine of the hybrid vehicle may include an exhaust catalyst, as shown in FIG. 2, that is optimally functional above a light-off temperature. A controller may be configured to perform a control routine, such as the example routine of FIG. 3, to coordinate operation of an electric booster and a catalyst heater prior to an engine start, to heat the catalyst to the light-off temperature and limit any undesirable emissions at engine start.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 149. For example, motor 120 may receive wheel torque from drive wheel 130 as indicated by arrow 122 where the motor may convert the kinetic energy of the vehicle to electrical energy for storage at energy storage device 149 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 149 as indicated by arrow 162.

During still other operating conditions, engine 110 may be operated by combusting fuel received from fuel system 192 as indicated by arrow 143. For example, engine 110 may be operated to propel the vehicle via drive wheel 130 as indicated by arrow 113 while motor 120 is deactivated. During other operating conditions, both engine 110 and motor 120 may each be operated to propel the vehicle via drive wheel 130 as indicated by arrows 113 and 122, respectively. A configuration where both the engine 110 and the motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 169, which may in turn supply electrical energy to one or more of motor 120 as indicated by arrow 113 or energy storage device 149 as indicated by arrow 162. As another example, engine 110 may be operated to drive motor 120 which may in turn provide a generator function to convert the engine output to electrical energy, where the electrical energy may be stored at energy storage device 149 for later use by the motor.

In still other examples, which will be discussed in detail below, motor 120 may in some examples be utilized to spin or rotate the engine 110 in an unfueled configuration. More specifically, motor 120 may rotate the engine 110 unfueled, using power from onboard energy storage device 149, which may include a battery, for example. In a case where motor 120 is used to rotate the engine 110 unfueled, fuel injection to engine cylinders may be prevented, and spark may not be provided to each of the engine cylinders.

Fuel system 192 may include one or more fuel storage tanks 145 for storing fuel on-board the vehicle. For example, fuel tank 145 may store one or more liquid fuels, including but not limited to: gasoline, diesel, and alcohol fuels. In some examples, the fuel may be stored on-board the vehicle as a blend of two or more different fuels. For example, fuel tank 145 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 143. Still other suitable fuels or fuel blends may be supplied to engine 110, where they may be combusted at the engine to produce an engine output. The engine output may be utilized to propel the vehicle as indicated by arrow 113 or to recharge energy storage device 149 via motor 120 or generator 160.

In some examples, energy storage device 149 may be configured to store electrical energy that may be supplied to other electrical loads residing on-board the vehicle (other than the motor), including operating an electric booster (supercharger), cabin heating and air conditioning, engine starting, headlights, cabin audio and video systems, etc. As a non-limiting example, energy storage device 149 may include one or more batteries and/or capacitors.

Control system 190 may communicate with one or more of engine 110, motor 120, fuel system 192, energy storage device 149, and generator 160. Control system 190 may receive sensory feedback information from one or more of engine 110, motor 120, fuel system 192, energy storage device 149, and generator 160. Further, control system 190 may send control signals to one or more of engine 110, motor 120, fuel system 192, energy storage device 149, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 108. Pedal 108 may refer schematically to a brake pedal and/or an accelerator pedal. Furthermore, in some examples control system 190 may be in communication with a remote engine start receiver 195 (or transceiver) that receives wireless signals 107 from a key fob 103 having a remote start button 105. In other examples (not shown), a remote engine start may be initiated via a cellular telephone, or smartphone based system where a user's cellular telephone sends data to a server and the server communicates with the vehicle to start the engine.

The vehicle system 100 may include a human machine interface (HMI) 133 coupled to the vehicle dashboard via which an operator may communicate with the control system 190. The HMI 133 may include a touch-sensitive display screen.

Energy storage device 149 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 149 from power source 180 via an electrical energy transmission cable 182. During a recharging operation of energy storage device 149 from power source 180, electrical transmission cable 182 may electrically couple energy storage device 149 and power source 180. While the vehicle propulsion system is operated to propel the vehicle, electrical transmission cable 182 may disconnected between power source 180 and energy storage device 149. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 149 from power source 180. For example, energy storage device 149 may receive electrical energy from power source 180 via one or more of electromagnetic induction, radio waves, and electromagnetic resonance. As such, it should be appreciated that any suitable approach may be used for recharging energy storage device 149 from a power source that does not comprise part of the vehicle. In this way, motor 120 may propel the vehicle by utilizing an energy source other than the fuel utilized by engine 110.

Fuel system 192 may periodically receive fuel from a fuel source residing external to the vehicle. As a non-limiting example, vehicle propulsion system 100 may be refueled by receiving fuel via a fuel dispensing device 147 as indicated by arrow 172. In some examples, fuel tank 145 may be configured to store the fuel received from fuel dispensing device 147 until it is supplied to engine 110 for combustion. In some examples, control system 190 may receive an indication of the level of fuel stored at fuel tank 145 via a fuel level sensor. The level of fuel stored at fuel tank 145 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s). The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters and ambient conditions such as local barometric pressure and humidity. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc., may be additionally or alternatively utilized in conjunction with the onboard navigation system to conduct route learning of commonly traveled routes by the vehicle.

FIG. 2 shows a schematic view 201 of a vehicle system 202 with an example engine system 200 including an engine 10. In one example, the engine system 200 may be a diesel engine system. In another example, the engine system 200 may be a gasoline engine system. In the depicted embodiment, engine 10 is a boosted engine coupled to a turbocharger 25 including a compressor 214 driven by a turbine 216. Specifically, fresh air is introduced along intake passage 42 into engine 10 via air cleaner 212 and flows to compressor 214. The compressor 214 may be any suitable intake-air compressor, such as a motor-driven or driveshaft-driven supercharger compressor. In engine system 10, the compressor 214 is a turbocharger compressor mechanically coupled to turbine 216 via a shaft 29, the turbine 216 driven by expanding engine exhaust. In one example, an air pump 232 may be coupled to the intake passage 42 upstream of the compressor 214. The air pump may facilitate to draw in ambient air and route it to the compressor 214.

Compressor 214 is coupled through charge-air cooler (CAC) 218 to throttle valve 20. Throttle valve 20 is coupled to engine intake manifold 222. From the compressor, the compressed air charge flows through the charge-air cooler 218 and the throttle valve 20 to the intake manifold 222. In the embodiment shown in FIG. 1, the pressure of the air charge within the intake manifold 222 is sensed by manifold air pressure (MAP) sensor 224. Temperature of ambient air entering the intake passage 42 may be estimated via an intake air temperature (IAT) sensor 52.

One or more sensors (not shown) may be coupled to an inlet of compressor 214. For example, a temperature sensor may be coupled to the inlet for estimating a compressor inlet temperature, and a pressure sensor may be coupled to the inlet for estimating a compressor inlet pressure. As another example, an ambient humidity sensor may be coupled to the inlet for estimating a humidity of the air charge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, the sensors may estimate a temperature, pressure, humidity, and air-fuel ratio of the air charge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

To assist the turbocharger 25, an additional intake air compressor, herein also referred to as an electric booster 255 may be incorporated into the vehicle propulsion system. Electric booster 255 may be powered via an onboard energy storage device 250, which may comprise a battery, capacitor, supercapacitor, etc. In one example, the energy storage device 250 may be the energy storage device 149 in FIG. 1. The electric booster may include a compressor driven by an electric motor. A speed of operation of the electric booster may include adjusting a speed of operation of the electric motor, the electric motor operated via the on-board energy storage device 250.

In one example, electric booster 255 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 255 may be actuated off, or deactivated. More specifically, operational control of the electric booster 255 may be achieved based on command signals (e.g. duty cycle or pulse width signals) received from the vehicle controller (e.g. controller 22). For example, the controller may send a signal to an electric booster actuator 255b, which may actuate on the electric booster. In one example the electric booster actuator 255b may comprise an electric motor which drives the compression of air.

Electric booster 255 may be positioned between a first electric booster conduit 259a, and a second electric booster conduit 259b. First electric booster conduit 259a may fluidically couple intake passage 42 to electric booster 255 upstream of electric booster bypass valve 262. Second electric booster conduit 259b may fluidically couple electric booster 255 to intake passage 42 downstream of electric booster bypass valve 262. As an example, air may be drawn into electric booster 255 via first electric booster conduit 259a upstream of electric booster bypass valve 262, and compressed air may exit electric booster 255 and be routed via second electric booster conduit 259b to intake passage 42 downstream of electric booster bypass valve 262. In this way, compressed air may be routed to engine intake 222.

In circumstances where the electric booster 255 is activated to provide boost more rapidly than if the turbocharger 25 were solely relied upon, it may be understood that electric booster bypass valve 262 may be commanded closed while electric booster 255 is activated. In this way, intake air may flow through turbocharger 25 and through electric booster 255. Once the turbocharger reaches the threshold speed, the electric booster 255 may be turned off, and the electric booster bypass valve 262 may be commanded open. In an alternate embodiment, an electric turbine may be coupled to the exhaust passage upstream of the turbine 216 which when operated may increase boost pressure in a way similar to the electric booster 255.

Intake manifold 222 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

A plurality of sensors, including an exhaust temperature sensor 228, an exhaust oxygen sensor, an exhaust flow sensor, and exhaust pressure sensor 229 may be coupled to the main exhaust passage 226. The oxygen sensor may be linear oxygen sensors or UEGO (universal or wide-range exhaust gas oxygen), two-state oxygen sensors or EGO, HEGO (heated EGO), a NOx, HC, or CO sensors.

Exhaust gas recirculation (EGR) delivery passage 280 may be coupled to the exhaust passage 226 downstream of turbine 216 to provide low pressure EGR (LP-EGR) to the engine intake manifold, upstream of compressor 214. An EGR valve 252 may be coupled to the LP-EGR passage at the junction of the LP-EGR passage 280 and the intake passage 42. LP_EGR valve 252 may be opened to admit a controlled amount of exhaust to the compressor outlet for desirable combustion and emissions control performance. LP-EGR valve 252 may be configured as a continuously variable valve or as an on/off valve.

In further embodiments, the engine system may include a high pressure EGR (HP-EGR) passage 284 in addition to or in place of the LP-EGR system wherein exhaust gas is drawn from upstream of turbine 216 and recirculated to the engine intake manifold 222, downstream of compressor 214. Each of the LP-EGR valve 252 and the HP-EGR valve 282 may be configured as a continuously variable valve or as an on/off valve.

During cold-start, fresh charge may be routed from the booster 252 to the HP-EGR valve 282 and EGR passage 284 and into the engine exhaust to minimize the flow path restriction associated with flow through engine 10. In addition, the work input into the gas by the electric booster may result in a charge temperature increase. If may be desirable for the charge to flow through the EGR path to keep charge temperatures elevated by avoiding the additional surface area/heat loss of the CAC and engine system.

A plurality of other sensors may also be coupled to EGR passages 280 and 284 for providing details regarding the composition and condition of the EGR. For example, a temperature sensor may be provided for determining a temperature of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

As shown in FIG. 2, exhaust from the one or more exhaust manifold sections may be directed to turbine 216 to drive the turbine. The combined flow from the turbine and the wastegate then flows through emission control device 270. In one example, the emission control device 270 may be a light-off catalyst. In general, the exhaust after-treatment device 270 is configured to catalytically treat the exhaust flow, and thereby reduce an amount of one or more substances in the exhaust flow. For example, the exhaust after-treatment device 270 may be configured to trap $NO_x$ from the exhaust flow when the exhaust flow is lean, and to reduce the trapped $NO_x$ when the exhaust flow is rich. In other examples, the exhaust after-treatment device 270 may be configured to disproportionate $NO_x$ or to selectively reduce $NO_x$ with the aid of a reducing agent. In still other examples, the exhaust after-treatment device 270 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In this way, the exhaust after-treatment device 270 may be a diesel particulate filter (DPF), a three way catalyst (TWC), a NOx trap, a NOx catalyst, selective catalytic reduction (SCR) system, various other emission control devices, or combinations thereof. The exhaust after-treatment device 270 may also be referred to as exhaust catalyst and may further include a temperature sensor 227 that may be used for determining the temperature of the exhaust catalyst.

During an engine cold-start, the temperature of the exhaust catalyst (as determined by the temperature sensor 227, for example) may be below a threshold temperature. In one example, the threshold temperature may be a catalyst light-off temperature. The threshold temperature may also be referred to as a desired temperature. As described previously, when the exhaust catalyst temperature is below the light-off temperature, the exhaust catalyst may not be able to effectively treat the constituents of the exhaust gas. As a result, untreated exhaust gas may be released into the atmosphere. The inventors have recognized that it may be possible to rapidly increase the temperature of the exhaust catalyst light-off temperatures prior to an anticipated cold-start by preemptively heating the exhaust catalyst by flowing compressed heated air through the catalyst. A heater 236 may be coupled to the exhaust passage 226 upstream of the exhaust after-treatment device 270 to heat the exhaust reaching the exhaust after-treatment device 270. During conditions such as engine idle-stop when the exhaust flow decreases, the heater may be operated to maintain the temperature of the exhaust after-treatment device 270 above its light-off temperature. The heater may also be operated during the preemptive heating of the exhaust catalyst to expedite catalyst light-off.

In response to an anticipated engine start while the temperature of the exhaust catalyst is lower than a threshold temperature and electric power is available, the electric booster 255 may be operated to increase a temperature of the exhaust after-treatment device 270 while maintaining the engine inactive. The threshold temperature may correspond to the light-off temperature of the exhaust after-treatment device 270. The anticipation of the engine start may be in response to one or more of an operator with a key fob approaching the vehicle, a driver side door opening, a remote request for activating a climate control system in the vehicle, and historical data for operation of the vehicle. The availability of electric power may include a higher than threshold state of charge of the on-board battery or the vehicle receiving electricity from a power source wirelessly or via an electrical energy transmission cable. During operation of the electric booster 255, the HP-EGR valve 282 housed in the HP-EGR passage 284 may be opened to route pressurized air from the intake passage 42 to the exhaust after-treatment device 270 coupled to the exhaust passage 226 via the HP-EGR passage 284. In one example, during operation of the electric booster 255, the intake throttle 20 may be closed and an opening of the HP-EGR valve 252 may be adjusted to increase energy of the pressurized air routed to the exhaust passage. In another example, during operation of the electric booster 255, the intake throttle 20 may be maintained open and intake valves and exhaust valves of one or more engine cylinders may be opened to route pressurized air from the intake passage to the exhaust after-treatment device 270 via the engine cylinders. Further, the heater 236 may be coupled to the exhaust passage upstream of the exhaust after-treatment device 270. In response to a request for vehicle start during the operation of the electric booster and heating of the exhaust after-treatment device 270, the vehicle may be operated only via torque from an electric motor while maintaining the engine inactive. In response to the temperature of the exhaust after-treatment device 270 increasing to the threshold temperature, the electric booster may be deactivated and the engine may be started. Details of preemptively heating the exhaust after-treatment device 270 upon anticipation of a cold-start is elaborated in FIG. 3.

Engine system 200 may further include control system 24. Control system 24 is shown receiving information from a plurality of sensors 26 (various examples of which are described herein) and sending control signals to a plurality of actuators 28 (various examples of which are described herein). As one example, sensors 26 may include MAP sensor 224, exhaust temperature sensor 228, exhaust pressure sensor 229, exhaust catalyst temperature sensor 227, compressor inlet temperature sensor, compressor inlet pressure sensor, ambient humidity sensor, IAT sensor, engine coolant temperature sensor, and EGR sensor. Other sensors such as additional pressure, temperature, air/fuel ratio, and composition sensors may be coupled to various locations in engine system 200.

The actuators 18 may include, for example, electric booster bypass valve 262, throttle 20, electric booster actuator 255b, EGR valve 252, wastegate 92, and fuel injector 66. The control system 24 may include a controller 22. The controller 22 may receive input data from the various sensors, process the input data, and trigger various actuators in response to the processed input data based on instruction or code programmed therein corresponding to one or more routines. In one example, upon anticipation of a cold-start condition, the controller 22 may send a signal to the electric booster actuator 255b to actuate the electric booster 255 to flow compressed air via the EGR passage 280 to the exhaust after-treatment device 270 to expedite attainment of the catalyst light-off temperature.

In this way, the components of FIG. 2 enable a system for a vehicle comprising: an exhaust catalyst coupled to an exhaust passage, an exhaust gas recirculation (EGR) passage coupling an intake passage to the exhaust passage upstream of the exhaust catalyst, and a controller including executable instructions stored in a non-transitory memory that cause the controller to: in response to anticipation of an upcoming engine start, initiating warmup of the exhaust catalyst by routing compressed air through the exhaust catalyst and delaying the engine start until a temperature of the catalyst increases to above a threshold temperature.

Figure 3:
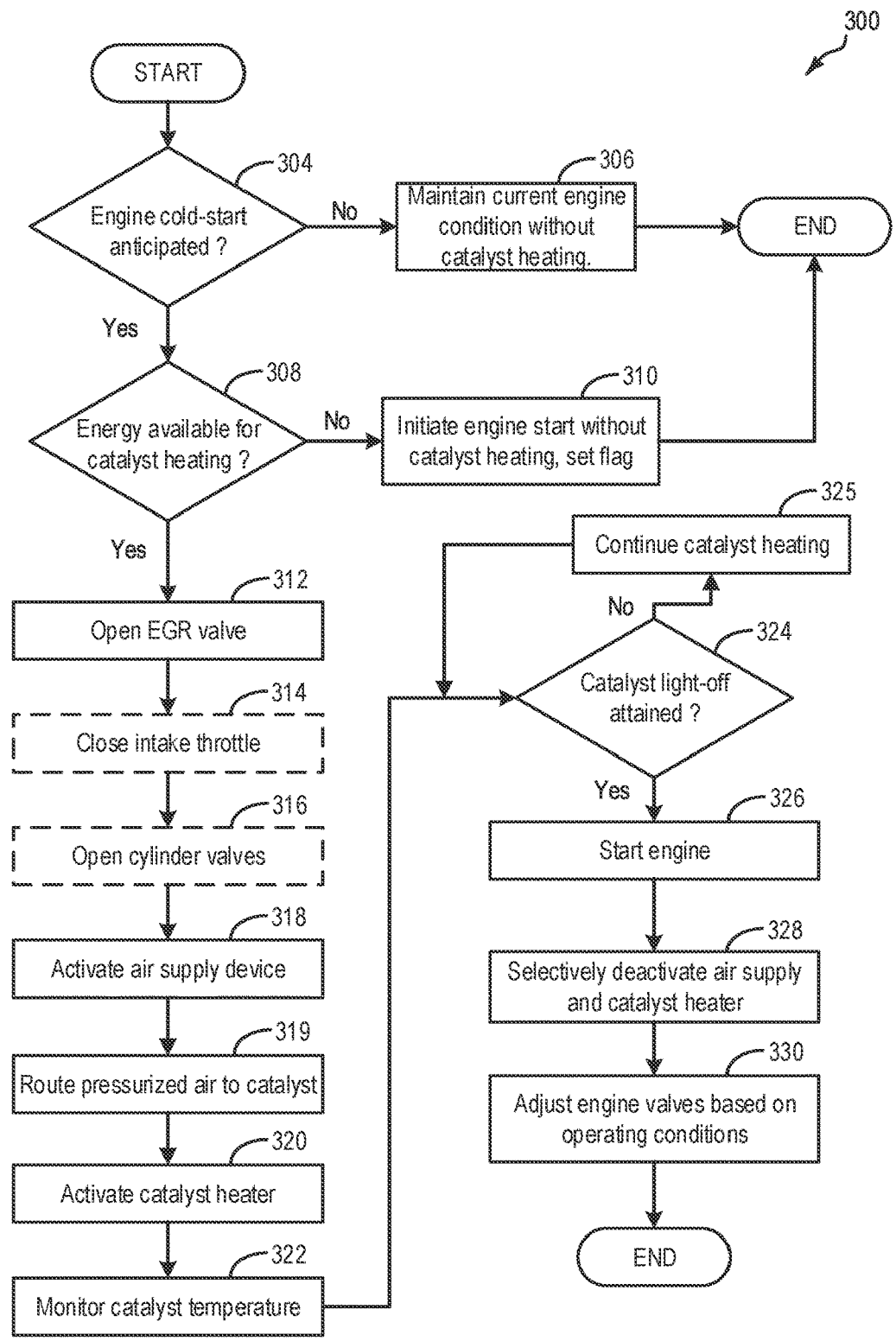
FIG. 3 shows a flow chart of an example method for pre-emptively heating the exhaust catalyst prior to an anticipated an engine cold-start when an exhaust catalyst temperature is lower than a threshold temperature, according to the present disclosure.

FIG. 3 shows an example method 300 that may be implemented for pre-emptively heating an exhaust catalyst (such as exhaust after-treatment device 270 in FIG. 2) prior to an anticipated an engine cold-start when an exhaust catalyst temperature is lower than a threshold temperature. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 304, the routine includes determining if an engine cold-start is anticipated during an engine-off condition. An engine start may be anticipated in response to a key/fob of the vehicle approaching the vehicle, the vehicle being unlocked (unlocking may be carried out remotely) the driver side door being opened, and the driver sitting on the driver's seat. The engine cold-start may be anticipated prior to engine cranking when the engine is still in an off condition. As an example, an engine start may be anticipated based on historic data of operation of the vehicle such as the vehicle being driven every day at a set time. As an example, an operator may drive the vehicle every day from home to his place of work at a certain time in the morning. An anticipated engine start may be a cold-start based on exhaust temperature and a temperature of the exhaust catalyst. A cold-start condition may be confirmed if upon the engine start, the temperature of the exhaust catalyst is below the catalyst light-off temperature and catalyst heating may be desired to increase the catalyst temperature to the light-off temperature. A temperature of the catalyst may be estimated based on an output of a dedicated catalyst temperature sensor (such as temperature sensor 227 in FIG. 2) and/or an output of an exhaust temperature sensor (such as exhaust temperature sensor 228 in FIG. 2).

If it is determined that an engine cold-start condition is not anticipated, at 306, current engine condition may be carried out without initiation of catalyst heating. In one example, if an engine cold-start is not anticipated, the engine may be continued in an off condition without engine cranking. In another example, if an engine hot-start is anticipated such as when the catalyst temperature is above its light-off temperature (such as during hot ambient conditions), the engine may be started such as via cranking without heating the catalyst. Following 306 method 300 may then end.

If it is determined that an engine cold-start is anticipated, at 308, the routine includes determining if energy is available for preemptive catalyst heating. In one example, availability of energy for catalyst heating may be based on a state of charge (SOC) of an on-board battery (such as energy storage device 149 in FIG. 1) capable of powering an electric motor (such as motor 120 in FIG. 1) during vehicle travel using motor torque. Catalyst heating may be carried out of the SOC of the battery is higher than a threshold charge. The threshold may correspond to a pre-determined level of charge needed to operate the engine components such as an electric booster (such as e-booster 255 of FIG. 2) for expedited catalyst heating and then to crank the engine following catalyst light-off. In another example, availability of energy for catalyst heating may be based on the vehicle receiving electricity from a power source (such as power source 180 in FIG. 1) wirelessly or via an electrical energy transmission cable (such as when the vehicle is parked at a garage and being charged from a charging station).

If it is determined that energy is not available for catalyst heating, at 310, a flag may be set indicating the lack of energy for effective catalyst heating. In one example, the engine may be started without heating the catalyst first. Engine operation at engine start may be modified to expedite catalyst heating or reduce NOx production. Example measures to increase exhaust heat for catalyst heating or reduce NOx production may include retarding combustion phasing, using post injections, deactivating some of the engine cylinders, increasing EGR rate, reducing boost pressure or closing the intake throttle. Following 310, method 300 may then end.

If it is determined that energy is available for catalyst heating prior to engine start, at 312, an EGR valve (such as HP-EGR valve 282 in FIG. 2) coupled to an EGR passage (such as HP-EGR passage 284 in FIG. 2) connecting an exhaust passage (such as exhaust passage 226 of FIG. 2) to an intake passage (such as intake passage 42 of FIG. 2) may be actuated to an open position. By opening the EGR valve, as fluidic communication is established between the exhaust passage and the intake passage. In one example, the EGR valve may be actuated to a fully open position to maximize flow between the exhaust passage and the intake passage and reduce nay pressure drop across the EGR valve.

At 314, optionally the intake throttle (such as intake throttle 20 in FIG. 2) may be actuated to a closed position. By closing the intake throttle, the entire air flow from the intake passage to the exhaust passage may be routed through the EGR passage and not through engine cylinders (such as engine cylinders 30 of FIG. 2). Flowing air through the EGR passage may provide lower resistance if the EGR valve is fully open. Alternatively, the EGR valve's opening (lift) may be adjusted in conjunction with closing of the intake throttle in order to increase the gas discharge pressure from the intake passage (such as from the e-booster). By increasing the gas discharge pressure, the work transfer into the air being discharged from the e-booster may be increased, thereby increasing the temperature of the air reaching the exhaust passage. In one example, the EGR valve may be partially opened and the throttle may be fully closed to force the pressurized air to pass through the constricted opening of the EGR passage, thereby heating up the pressurized air.

At 316, optionally intake and exhaust valves of one or more cylinders may be opened to allow fluidic communication between an intake manifold (such as intake manifold 222 of FIG. 2) and an exhaust manifold (such as exhaust manifold 36 of FIG. 2). If the engine cylinder valves are opened to route pressurized air from the intake passage to the exhaust passage, the intake throttle may be maintained in an open position. In one example, the electronically actuated or cam actuated intake and exhaust valves of each cylinder may be actuated to their respective open positions. In another example, intake and exhaust valves of certain cylinders (not all cylinders) may be actuated to their respective open positions. The opening of each of the intake valve and the exhaust valve may be adjusted based on the desired gas discharge pressure. As an example, by partially opening the valves of one or more cylinders, pressurized air may be routed from the intake passage to the exhaust passage via the cylinders, wherein due to the higher resistance path, the work done on the air increases, thereby increasing the air temperature. In this way, pressurized air may be simultaneously routed from the intake to the exhaust passage via the EGR passage and the engine cylinders. The flow through the engine cylinders may be used in engine systems not including a HP-EGR system.

At 318, an air supply device such as an electric booster may be activated to generate pressurized air. In one example, as seen in FIG. 2, the air supply device may be an electric booster coupled to the intake passage. In circumstances where the electric booster is activated to provide compressed air, an electric booster bypass valve (such as valve 262 in FIG. 2) may be commanded closed while electric booster is activated. In this way, intake air may flow through electric booster wherein the air is pressurized. In another example, the air supply device may be an air pump (such as air pump 232 in FIG. 2) coupled to the intake passage. In systems including both the air pump and the electric booster, both the air pump and the electric booster may be activated to draw in ambient air (via the air pump) and then pressurize the ambient air (at the e-booster).

In further examples, the air supply device may be an electric turbine or an air pump coupled to the exhaust passage upstream of the exhaust catalyst. If an exhaust air supply device is used to flow pressurized air to the exhaust catalyst, the EGR valve and the cylinder intake and exhaust valves may not be opened.

At 319, pressurized air may be routed from the air supply device to the exhaust catalyst. If the air supply device is housed in the intake passage (such as e-booster and/or air pump), the pressurized air may be routed through the EGR passage and/or the cylinder intake and exhaust valves. If the air supply device is housed in the exhaust passage (such as an e-turbine and/or air pump), the pressurized air may be directly routed to the catalyst. As the pressurized air reaches and flows through the catalyst, the energy from the air is transferred to the catalyst and the catalyst temperature may increase.

In order to further facilitate heating of the catalyst, if a catalyst heater is present, at 320, the catalyst heater may be activated. The heater may warm up the pressurized air flowing through the catalyst, thereby further expediting catalyst heating. As the catalyst is heated, at 322, the change in catalyst temperature is monitored.

At 324, the routine includes determining if the catalyst light-off temperature has been attained. At or above the light-off temperature, the catalyst may function to oxidize and reduce exhaust constituents in an exhaust gas, thereby converting toxic gases and pollutants in the exhaust gas to less toxic pollutants or inert constituents which are then released into the atmosphere. If it is determined that the catalyst temperature is below the light-off temperature, at 325, catalyst heating may be continued by flowing pressurized, heated air through the catalyst. Even through a request for engine start such as via indication from a start/stop switch, a remote switch (such as on fob or smart device) or a dashboard key, the engine may not be cranked for starting during the catalyst heating phase. A message may be displayed to the operator via the dashboard or a smart device regarding the delay for engine start while the catalyst is being heated. Also, the vehicle may be started and propelled solely via motor torque while the engine is maintained in an off condition while the catalyst is being heated. In this way, during a cold-start, no exhaust gas is emitted from the engine while the catalyst temperature is below the light-off temperature, thereby substantially eliminating undesirable cold-start emissions.

If it is determined that the catalyst has attained the light-off temperature, it may be inferred that catalyst heating is complete and the catalyst is fully active. At 326, the engine may be started by cranking the engine via a starter motor. Fuel may be injected to the engine cylinders followed by spark for initiate combustion. The engine may be cranked until a threshold engine speed, such as engine idle speed is reached.

Upon engine start, at 328, supply of pressurized air to the catalyst and the catalyst heater may be selectively deactivated. In one example, based on engine load, if boost pressure is not desired and turbine spool up is not desired, the e-booster supplying pressurized air for catalyst heating may be deactivated. In another example, even though catalyst heating has been completed, boost pressure may be desired for engine operation and pressurized air may be desired for expedited turbine spool up. During such conditions, the e-booster (or e-turbine) may be continued to be operated to provide pressurized air to the compressor (or turbine) for increased boost pressure.

In one example, once the catalyst reaches the light-off temperature, the supply of heat is no longer desired and the catalyst heater may be deactivated. In another example, such as during cold ambient conditions, even if the catalyst has reached the light-off temperature, catalyst heating may be continued to maintain the catalyst temperature above the light-off temperature. During such a condition, the catalyst heater may not be deactivated and may be maintained operational.

At 330, engine valves including the EGR valve and the engine cylinder valves may be adjusted based on engine operating conditions. Opening and closing of the engine cylinder valves may be based on the engine cycle. The opening of the EGR valve may be adjusted based on engine dilution demand. Engine dilution demand may be estimated by the controller based on one or more of engine temperature, engine speed, and engine load. The opening of the EGR valve may be directly proportional to the engine dilution demand, the opening of the valve increased with increasing dilution demand.

Figure 4:
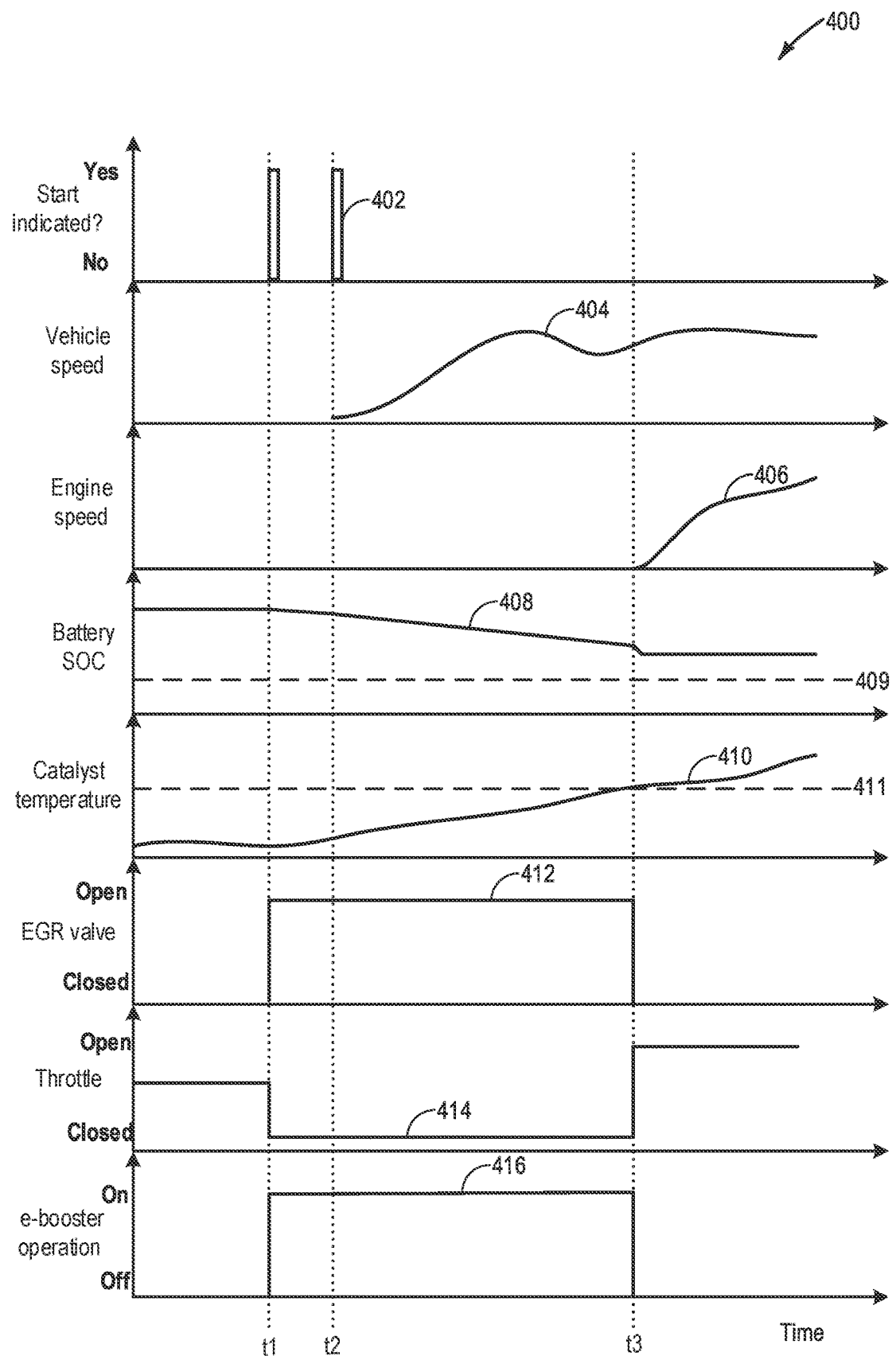
FIG. 4 shows a prophetic example of catalyst heating prior to an engine cold-start to decrease a catalyst light-off time, according to the present disclosure.

In this way, in response to an upcoming engine start during a cold-start condition, an exhaust gas recirculation (EGR) valve coupled to an EGR passage may be opened to establish fluidic communication between an intake passage and an exhaust passage, an electric compressor and/or an air pump coupled to the intake passage may be activated, compressed air may be routed from the intake passage to an exhaust catalyst housed in the exhaust passage, and the engine may be maintained inactive until attainment of light-off of the exhaust catalyst Turning now to FIG. 4, map 400 depicts a prophetic example of preemptively heating an exhaust catalyst (such as exhaust after-treatment device 270 in FIG. 2) coupled to an engine of a vehicle upon anticipation of an engine cold-start. The horizontal (x-axis) denotes time and the vertical markers t1-t3 identify significant times in the pre-emptive heating of the exhaust catalyst during an engine-off condition.

The first plot, line 402, depicts an indication of vehicle start. The indication can be an anticipation of an upcoming vehicle and engine start or a request for an actual vehicle and engine start. The second plot, line 404, denotes a speed of operation of the vehicle as estimated via a vehicle speed sensor. The third plot, line 406, denotes a speed of operation of the engine as estimated via a crankshaft position sensor. The fourth plot, line 408, depicts a state of charge (SOC) of an on-board battery configured to power an electric motor during vehicle operation and/or an electric booster (such as an electric compressor coupled to an intake passage). Dashed line 409 denotes a threshold SOC below which the electric booster cannot be operated prior to engine start. The fifth plot, line 410, denotes a temperature of the exhaust catalyst as estimated via a catalyst temperature sensor. Dashed line 411 denotes a light-off temperature of the exhaust catalyst below which the catalyst is not completely operational. The sixth plot, line 412, denotes a position of an EGR valve regulating fluidic communication between the intake passage and the exhaust passage of the engine via a HP-EGR passage. The seventh plot, line 414, denotes a position (opening) of an intake throttle. The eighth plot, line 416, shows operation of an electric booster coupled to the intake passage.

Prior to time t1, the vehicle is not operated and the engine is in an off condition. The SOC of the on-board battery is higher than the threshold SOC and the electric booster is maintained inactive. At time t1, a first indication of an anticipated vehicle and engine start is received. In this example, the anticipation can be from a driver side door of the vehicle opening. In response to the temperature of the exhaust catalyst being lower than the threshold temperature 411 during the indication of an upcoming engine start and based on a higher than threshold battery SOC, an exhaust catalyst heating routine is initiated.

In order to heat the exhaust catalyst, the electric booster is activated to generate pressurized air at the intake passage. The EGR valve is actuated to a fully open position while the intake throttle is actuated to a closed position to route the entire volume of pressurized air form the intake passage to the exhaust passage via the EGR passage. Between time t1 and t2, as pressurized air flows through the exhaust catalyst, and the temperature of the catalyst increases.

At time t2, vehicle is keyed on and engine start is desired. In this example, the vehicle key on can include a start stop button on the dashboard being pressed. However, since the temperature of the exhaust catalyst is still lower than the threshold temperature 411, even though an engine start request is made, the engine is maintained in an off condition. Between time t2 and t3, the vehicle is propelled solely via motor torque. The operator is informed via a message on the vehicle dashboard stating that the engine will be started upon completion of the exhaust catalyst heating routine.

At time t3, in response to the temperature of the catalyst increasing to the threshold temperature, it is inferred that the catalyst is lit-off and further heating of the catalyst is not desired. Therefore, the electric booster is deactivated. The EGR valve is closed and the intake throttle is opened. The engine is cranked and combustion is initiated upon injection of fuel followed by spark. After time t3, the vehicle is operated with engine torque.

In this way, by starting to heat an exhaust catalyst prior to an actual engine start request, the time taken by the exhaust catalyst to reach light-off temperatures (or catalyst light-off time) may be reduced. By using a combination of existing engine components such as the e-booster and the EGR passage, air flow through the catalyst may be increased to expedite catalyst heating. By adjusting openings of the EGR valve and the intake throttle, the temperature of pressurized air used for catalyst heating may be further increased. The technical effect of inhibiting exhaust flow during the catalyst warm up is that undesired cold-start emissions may be completely eliminated. Overall, catalyst light-off may be expedited and emission compliance may be improved.

An example method for an engine in a vehicle comprises: operating an electric booster to increase a temperature of an exhaust catalyst while maintaining the engine inactive. In the preceding example, additionally or optionally, the operation of the electric booster is in response to an anticipated engine start while the temperature of the exhaust catalyst is lower than a threshold temperature and availability of electric power, the threshold temperature corresponding to a light-off temperature of the exhaust catalyst. In any or all of the preceding examples, additionally or optionally, the anticipation of the engine start is in response to one or more of an operator with a key fob approaching the vehicle, a driver side door opening, a remote request for activating a climate control system in the vehicle, and historical data for operation of the vehicle. In any or all of the preceding examples, additionally or optionally, the vehicle is a hybrid vehicle, and wherein availability of electric power includes a higher than threshold state of charge of an on-board battery or the vehicle receiving electricity from a power source wirelessly or via an electrical energy transmission cable. In any or all of the preceding examples, additionally or optionally, the electric booster includes one or more of an electric compressor coupled to an intake passage upstream of an opening of an exhaust gas recirculation (EGR) passage and an intake throttle, an electric turbine coupled to an exhaust passage upstream of the exhaust catalyst, and an air pump coupled to the intake passage upstream of the opening of the EGR passage. Any or all of the preceding examples, further comprising, additionally or optionally, during operation of the electric booster, opening an EGR valve housed in the EGR passage to route pressurized air from the intake passage to the exhaust catalyst coupled to the exhaust passage. Any or all of the preceding examples, further comprising, additionally or optionally, during operation of the electric booster, closing the intake throttle and adjusting an opening of the EGR valve to increase energy of the pressurized air routed to the exhaust passage. Any or all of the preceding examples, further comprising, additionally or optionally, during operation of the electric booster, maintaining the intake throttle open, and opening intake valves and exhaust valves of one or more engine cylinders to route pressurized air from the intake passage to the exhaust catalyst via the engine cylinders. Any or all of the preceding examples, further comprising, additionally or optionally, during operation of the electric booster, activating a heater coupled to the exhaust passage upstream of the exhaust catalyst. Any or all of the preceding examples, further comprising, additionally or optionally, in response to a request for vehicle start during the operation of the electric booster, operating the vehicle only via torque from an electric motor while maintaining the engine inactive. Any or all of the preceding examples, further comprising, additionally or optionally, in response to the temperature of the exhaust catalyst increasing to the threshold temperature, deactivating the electric booster, and starting the engine.

Another example method for an engine in a hybrid vehicle, comprises: in response to an upcoming engine start during a cold-start condition, opening an exhaust gas recirculation (EGR) valve coupled to an EGR passage to establish fluidic communication between an intake passage and an exhaust passage, activating an electric compressor and/or an air pump coupled to the intake passage, routing compressed air from the intake passage to an exhaust catalyst housed in the exhaust passage, and maintaining the engine inactive until attainment of light-off of the exhaust catalyst. In the preceding example, additionally or optionally, the upcoming engine start is anticipated in response to one or more of a drive history of the vehicle, an operator with a key fob of the vehicle approaching the vehicle, and the operator fastening a seat belt in a driver's seat. Any or all of the preceding examples, further comprising, additionally or optionally, adjusting an opening of the EGR valve and an intake throttle to regulate pressure and temperature of air routed from the intake passage to the exhaust catalyst. In any or all of the preceding examples, additionally or optionally, the EGR passage is a high pressure EGR passage configured to recirculate exhaust gas from upstream of an exhaust turbine to the engine intake passage, downstream of each of an intake compressor and the electric compressor. Any or all of the preceding examples, further comprising, additionally or optionally, opening intake valves and exhaust valves of engine cylinders to route compressed air from the intake passage to the exhaust catalyst via the engine cylinders, and during routing of compressed air to the exhaust catalyst, operating an exhaust catalyst heater coupled to the exhaust catalyst. Any or all of the preceding examples, further comprising, additionally or optionally, in response to the attainment of light-off of the exhaust catalyst, deactivating the electric compressor and/or the air pump, and initiating combustion in the engine cylinders.

Another example for an engine, comprises: an exhaust catalyst coupled to an exhaust passage, an exhaust gas recirculation (EGR) passage coupling an intake passage to the exhaust passage upstream of the exhaust catalyst, and a controller including executable instructions stored in a non-transitory memory that cause the controller to: in response to anticipation of an upcoming engine start, initiating warmup of the exhaust catalyst by routing compressed air through the exhaust catalyst and delaying the engine start until a temperature of the catalyst increases to above a threshold temperature. Any of the preceding examples, further comprising, additionally or optionally, an electric booster coupled to a bypass conduit of the intake passage configured to supply the compressed air during warmup of the exhaust catalyst. In any or all of the preceding examples, additionally or optionally, the routing of compressed air is through one or more of the EGR passage and engine cylinders, operating an exhaust catalyst heater coupled to the exhaust catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
operating an electric booster to increase a temperature of an exhaust catalyst while maintaining the engine inactive, and during operation of the electric booster, closing an intake throttle positioned between a high pressure exhaust gas recirculation (EGR) valve and an intake manifold and adjusting an opening of the high pressure EGR valve to increase energy of pressurized air routed to an exhaust passage.

2. The method of claim 1, wherein the operation of the electric booster is in response to an anticipated engine start while the temperature of the exhaust catalyst is lower than a threshold temperature and availability of electric power, the threshold temperature corresponding to a light-off temperature of the exhaust catalyst.

3. The method of claim 2, wherein the anticipation of the engine start is in response to one or more of an operator with a key fob approaching the vehicle, a driver side door opening, a remote request for activating a climate control system in the vehicle, and historical data for operation of the vehicle.

4. The method of claim 2, wherein the vehicle is a hybrid vehicle, and wherein availability of electric power includes a higher than threshold state of charge of an on-board battery or the vehicle receiving electricity from a power source wirelessly or via an electrical energy transmission cable.

5. The method of claim 2, further comprising, in response to the temperature of the exhaust catalyst increasing to the threshold temperature, deactivating the electric booster, and starting the engine.

6. The method of claim 1, wherein the electric booster includes one or more of an electric compressor coupled to an intake passage upstream of an opening of a high pressure EGR passage, an electric turbine coupled to the exhaust passage upstream of the exhaust catalyst, and an air pump coupled to the intake passage upstream of the opening of the high pressure EGR passage.

7. The method of claim 6, further comprising, during operation of the electric booster, opening the high pressure EGR valve housed in the high pressure EGR passage to route pressurized air from the intake passage to the exhaust catalyst coupled to the exhaust passage.

8. The method of claim 7, further comprising, during operation of the electric booster, after closing the intake throttle, opening the intake throttle, and opening intake valves and exhaust valves of one or more engine cylinders to route pressurized air from the intake passage to the exhaust catalyst via the engine cylinders.

9. The method of claim 8, further comprising, during operation of the electric booster after closing the intake throttle, opening the intake throttle, and partially opening intake valves and exhaust valves of one or more engine cylinders to increase energy of pressurized air routed from the intake passage to the exhaust catalyst via the engine cylinders.

10. The method of claim 6, further comprising, during operation of the electric booster, activating a heater coupled to the exhaust passage upstream of the exhaust catalyst.

11. The method of claim 1, further comprising, in response to a request for vehicle start during the operation of the electric booster, operating the vehicle only via torque from an electric motor while maintaining the engine inactive.

12. A method for an engine in a hybrid vehicle, comprising:
in response to an upcoming engine start during a cold-start condition,
opening an exhaust gas recirculation (EGR) valve coupled to an EGR passage to establish fluidic communication between an intake passage and an exhaust passage;
activating an electric compressor and/or an air pump coupled to the intake passage;
routing compressed air from the intake passage to an exhaust catalyst housed in the exhaust passages;
closing an intake throttle positioned between the EGR valve and an intake manifold while adjusting an opening of the EGR valve to increase energy of pressurized air routed to the exhaust passage; and
maintaining the engine inactive until attainment of light-off of the exhaust catalyst.

13. The method of claim 12, wherein the upcoming engine start is anticipated in response to one or more of a drive history of the vehicle, an operator with a key fob of the vehicle approaching the vehicle, and the operator fastening a seat belt in a driver's seat.

14. The method of claim 12, further comprising, adjusting the opening of the EGR valve and the intake throttle to regulate pressure and temperature of air routed from the intake passage to the exhaust catalyst, and activating a heater coupled to the exhaust passage upstream of the exhaust catalyst.

15. The method of claim 12, wherein the EGR passage is a high pressure EGR passage configured to recirculate exhaust gas from upstream of an exhaust turbine to the engine intake passage, downstream of each of an intake compressor and the electric compressor.

16. The method of claim 12, further comprising, opening intake valves and exhaust valves of engine cylinders to route compressed air from the intake passage to the exhaust catalyst via the engine cylinders, and during routing of compressed air to the exhaust catalyst, operating an exhaust catalyst heater coupled to the exhaust catalyst.

17. The method of claim 16, further comprising, in response to the attainment of light-off of the exhaust catalyst, deactivating the electric compressor and/or the air pump, and initiating combustion in the engine cylinders.

18. A system for an engine, comprising:
an exhaust catalyst coupled to an exhaust passage;
an exhaust gas recirculation (EGR) passage coupling an intake passage to the exhaust passage upstream of the exhaust catalyst; and
a controller including executable instructions stored in a non-transitory memory that cause the controller to:
in response to anticipation of an upcoming engine start, initiating warmup of the exhaust catalyst by routing compressed air through the exhaust catalyst via the EGR passage, closing an intake throttle positioned between an EGR valve and an intake manifold while adjusting an opening of the EGR valve to increase energy of pressurized air routed to the exhaust passage, and delaying the engine start until a temperature of the catalyst increases to above a threshold temperature.

19. The system of claim 18, further comprising an electric booster coupled to a bypass conduit of the intake passage configured to supply the compressed air during warmup of the exhaust catalyst.

20. The system of claim 18, wherein the routing of compressed air is through one or more of the EGR passage and engine cylinders while operating an exhaust catalyst heater coupled to the exhaust catalyst.

* * * * *